Figure 1:
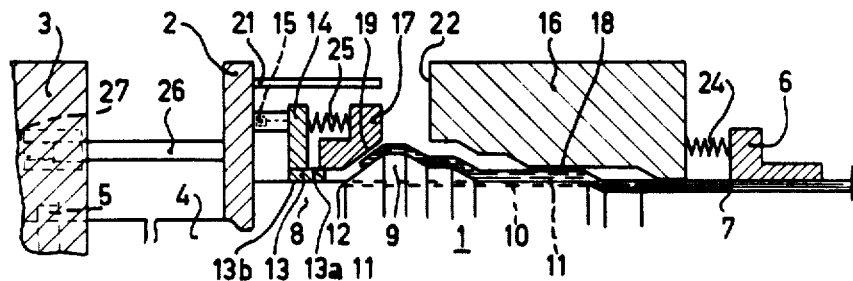

United States Patent
Acda

[11] 3,893,794
[45] July 8, 1975

[54] APPARATUS FOR FORMING A SOCKET IN THERMOPLASTIC PIPE

[75] Inventor: Petrus Marinus Acda, Enkhuizen, Netherlands

[73] Assignee: Polva Nederland B.V., Enkhuizen, Netherlands

[22] Filed: Oct. 9, 1973

[21] Appl. No.: 404,335

[30] Foreign Application Priority Data
Oct. 13, 1972  Netherlands ................ 7213924

[52] U.S. Cl. .................. 425/393; 425/457
[51] Int. Cl. ............................ B29c 17/00
[58] Field of Search .......... 425/457, 384, 392, 393, 425/460

[56] References Cited
UNITED STATES PATENTS

| | | |
|---|---|---|
| 3,360,826 | 1/1968 | Lorang ........................... 425/393 |
| 3,570,065 | 3/1971 | Guerrero ........................ 425/393 |
| 3,749,543 | 7/1973 | Stansbury ...................... 425/393 |
| 3,776,682 | 12/1973 | Parmann ........................ 425/384 |
| 3,806,301 | 4/1974 | Osterhagen et al. ............ 425/384 |

*Primary Examiner*—Al Lawrence Smith
*Assistant Examiner*—Robert C. Watson
*Attorney, Agent, or Firm*—Frank R. Trifari; David R. Treacy

[57] ABSTRACT

An apparatus for forming a socket on a tube of a thermoplastic material, in which an upsetting movement is effected so that the socketed end is given a wall thickness which is at least equal to the wall thickness of the initial pipe. The apparatus comprises a mandrel, a two-part mold and a thrust member. An annular molding chamber is produced which has a radial dimension which is at least equal to the wall thickness of the pipe to be treated.

7 Claims, 3 Drawing Figures

APPARATUS FOR FORMING A SOCKET IN THERMOPLASTIC PIPE

The invention relates to apparatus for providing a length of thermoplastic piping with a socket by means of a shaping mandrel by relative axial movement between the mandrel and the preheated pipe end, the mandrel having a base part along which a shaping ring is adapted to slide. The outer surface of the mandrel has cylindrical portions of stepwise varying diameters and adjoining conical transition portions, the shaping ring having at least one cylindrical portion the diameter of which is greater than the outer diameter of the pipe. The base part of the mandrel at the insertion end has a conical portion of decreasing diameter and at the rear end has a cylindrical portion having a diameter which is substantially equal to the outer diameter of the pipe. The mandrel is also provided with means to prevent radial deformation of the shaping ring during the formation of a socket.

By means of a method described in West German Offenlegungsschrift 2,061,899 published July 1, 1971 the pipe end is provided with a socket the inner surface of which is accurately calibrated while the opening for axially securing the gasket to be eventually inserted has an inner diameter which is substantially equal to the outer diameter of the tube. Owing to the radial deformation of the material of the socket the latter has a wall thickness which is smaller than that of the adjoining non-deformed pipe portion. In order to obviate this disadvantage generally a section of piping of a length equal to the pipe end to be deformed is arranged so as to fit tightly around the latter, after which the pipe end and the section of piping are heated and deformed simultaneously by axial insertion of the mandrel. Although a socket of increased wall thickness is easily obtained by this method, it requires the use of additional piping material, which is not always readily available, for example in the case of piping of non-standard diameter.

It is an object of the present invention to provide an apparatus by which a socket may have its wall thickness increased during its formation without the use of additional piping material.

The apparatus includes an axially movably supported mandrel and a fixed pipe clamp for clamping the pipe in coaxial relationship with the mandrel. The mandrel comprising a base part on which a shaping ring may be slipped from the insertion end of the mandrel. The shaping ring has cylindrical portions of stepwise varying diameters and adjoining conical transition portions, the outer surface having at least one cylindrical portion the diameter of which is greater than the outer diameter of the pipe. The base part of the mandrel at the insertion end has a conical end portion of decreasing diameter and at the rear end has a cylindrical portion of a diameter which is substantially equal to the outer diameter of the pipe. The mandrel is also provided with means for preventing radial deformation of the shaping ring during the formation of a socket.

The apparatus further comprises a mold which is adapted to be split at right angles to the mandrel axis and which comprises a first and a second mold part which each enclose a mold cavity the outline of which matches the corresponding part of the mandrel, and a tubular thrust member which has an outer cylindrical surface of a diameter which is at least equal to the outer diameter of the pipe to be treated and an inner cylindrical surface which is supported so as to be slidable along the base part at the rear end of the mandrel. The first mold part is movably supported against the pipe clamp in coaxial relationship with the mandrel and has its parting surface directed to the insertion end of the mandrel, while the second mold part has its parting surface directed to the insertion end of the mandrel and is slidably supported on the outer cylindrical surface of the tubular thrust member.

In a preferred embodiment of an apparatus according to the invention, in the closed position of the mold parts the location of the parting face of the mold relative to the mandrel is determined by a rod which is secured to the base part of the rear end of the mandrel in parallel relationship therewith and engages a stop on the first mold part. Thus the correct relative positions of the mandrel and the mold can be simply defined.

In another preferred embodiment of an apparatus according to the invention the first mold part is connected to the pipe clamp by means of a spring and the second mold part is connected to the thrust member by means of a spring, the force of the former spring being greater than that of the latter spring. Thus the desired closing force of the mold parts is easily obtained.

In another preferred embodiment of the apparatus according to the invention the thrust member is connected to the base part at the rear end of the mandrel by a hydraulic cylinder, enabling relative movement of the thrust member and the mandrel together with the closed mold while retaining the desired closing force of the mold parts.

In order to prevent the socket from laterally buckling at the area at which it joins the pipe when carrying out the method according to the invention, in a further preferred embodiment of an apparatus according to the invention the conical end part at the insertion end of the mandrel is extended by a cylindrical portion having an outer surface the diameter of which is substantially equal to the inner diameter of the pipe to be treated.

In still another preferred embodiment of the apparatus according to the invention the first mold part of the mould is split along an axial plane. Thus after the formation of the socket the socketed pipe can easily be removed from the pipe clamp after the first mold part has been opened.

In using this apparatus, preferably the pipe is stationary and the mandrel is axially movable. Also, mold parts are used having the parting face of the mold parts intersecting that end edge of the cylindrical portion of the molding chamber which faces the rear end of the base part of the mandrel. During axial movement of the mandrel towards the clamped pipe, first the second mold part and the thrust member are caused to move together with the mandrel until the mold parts engage one another in the position in which the parting face intersects the end edge, then the mandrel together with the engaging mold parts is moved further and finally the thrust member is separately moved further.

Figure 2:
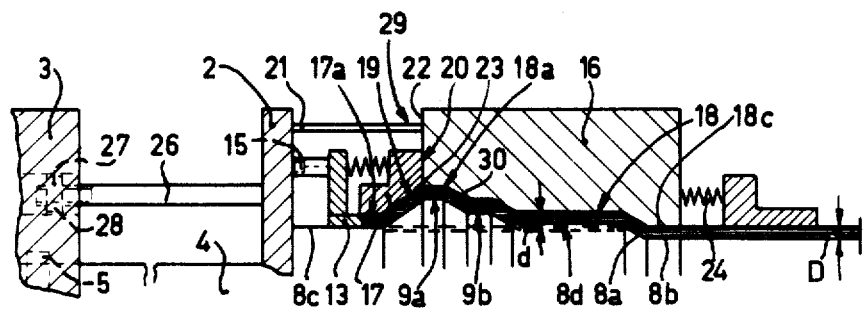
Figure 3:
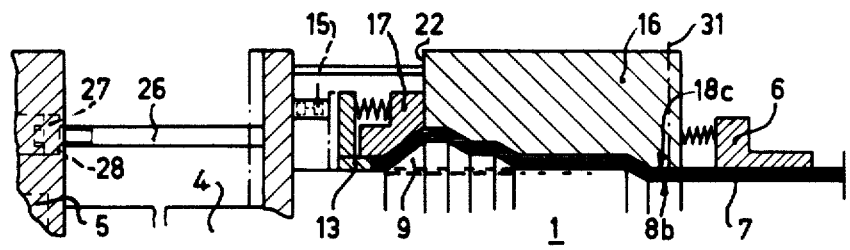

An embodiment of the invention will now be described by way of example with reference to the accompanying diagrammatic drawings, in which:

FIGS. 1, 2 and 3 are axial sectional views of an apparatus according to the invention which show the component parts in positions which they occupy in successive stages of operation.

Referring now to FIGS., the apparatus shown comprises a cylindrical mandrel 1 which is secured to a vertical mounting plate 2 with its axis at right angles to this plate by means of which the mandrel 1 is axially movably supported by a frame part 3 of the apparatus. This is shown schematically by a spindle 4 which is secured to the mounting plate 2 in axial alignment with the mandrel 1 and can be driven by a drive mechanism 5 accommodated in the frame part 3.

The apparatus further comprises a sleeve-shaped pipe clamp 6 which is rigidly secured to the frame of the apparatus in axial alignment with the spindle 4 and serves to clampingly support a length of piping 7 of a thermoplastic material which is to be treated. For this purpose the pipe clamp 6 may be split along an axial plane into two hinged parts which may be locked together.

The mandrel 1 comprises a metal cylindrical base part 8 and a deformable shaping ring 9 which is made of a material the hardness of which lies between the hardness of the material of the pipe 7 at the ambient temperature and the hardness thereof at the deformation temperature and can be slipped on the base part 8 from the insertion end of the mandrel 1.

The total outer surface of the mandrel 1 has cylindrical portions of stepwise varying diameters and adjoining conical transition portions inclined at acute angles to the mandrel axis. The outer surface of the shaping ring 9 has two cylindrical portions 9a and 9b of different diameters greater than the outer diameter of the pipe 7. The base part 8 has a cylindrical portion 8d the diameter of which is substantially equal to the outer diameter of the pipe 7. At the insertion end of the mandrel adjacent the cylindrical portion 8d and facing the pipe clamp 6 the base part 8 has a tapering portion 8a which preferably terminates in a cylindrical end portion 8b the diameter of which is substantially equal to the inner diameter of the pipe 7. At the rear end of the mandrel the metal base part 8 further comprises a cylindrical portion 8c which adjoins the outer surface of the shaping ring 9 and has a diameter which is substantially equal to the outer diameter of the pipe 7.

To avoid radial deformation of the shaping ring 9 during operation of the apparatus the cylindrical portion 8d of the base part 8 is provided with a plurality of evenly spaced grooves 10 of dovetail-shaped section which extend parallel to the mandrel axis and in which corresponding ribs 11 on the inner surface of the shaping ring 9 fittingly engage. At the rear end of the mandrel the ends of the grooves 10 form a stop 12 for the ribs 11 which prevents the ring 9 from sliding further along the basepart 8 during operation of the apparatus.

The apparatus further comprises a tubular thrust member 13 having a cylindrical outer surface 13a the diameter of which is at least equal to the outer diameter of the pipe 7 and a cylindrical inner surface 13b by which the thrust member is slidably guided on the cylindrical rear end 8c of the basepart 8. The thrust member 13 is axially movable relative to the mandrel 1, for example by means of a hydraulic cylinder-and-piston mechanism 15 which at one end is secured to the mounting plate 2 and at the other end engages an end flange 14 projecting radially from the thrust member 13.

The apparatus further comprises a sleeve-shaped mold 29 which is split along a radial plane 20 and comprises a first mold part 16 enclosing a mold cavity 18 and a second mold part 17 enclosing a mold cavity 19, which mold parts in the closed position of the mold (see FIGS. 2 and 3) together enclose a molding chamber 30 such that between the outer surface of the mandrel 1 and the inner surface of the mold parts 16 and 17 an annular intermediate space is available the radial dimension $d$ of which is at least equal to the wall thickness D of the pipe 7.

When the first mold part 16 is moved relative to the mandrel its position is determined by a rod 21 which is secured to the mounting plate 2 so as to extend parallel to the mandrel and which in the closed position of the mold parts 16 and 17 (FIG. 2) abuts a stop 22 of the first mold part 16. This stop 22 may be in the form of an extension of the parting face 20 which in this position (FIG. 2), with a mandrel 1 of the shape shown, intersects an edge 23 of a cylindrical portion 18a of greatest diameter of the molding chamber 30, which edge faces the rear end 8c of the base part 8 adjoining the shaping ring 9.

At its end facing the pipe clamp 6 the first mold part 16 has a cylindrical portion 18c by means of which it is guided on a frame part (not shown) supporting the pipe clamp so as to be axially slidable along the clamped pipe 7, while the second mold part 17 at the rear end of the mandrel is slidable with its cylindrical surface 17a on the surface 13a of the thrust member 13.

In the stage of operation of the apparatus shown in FIG. 1, i.e. before the mold parts 16 and 17 engage one another, the first mold part 16 is connected to the pipe clamp 6 by a compression spring 24 and the second mold part 17 is connected to the radial flange 14 of the thrust member 13 by a compression spring 25. The force of the spring 24 exceeds that of the spring 25 so that in the closed position of the mold parts 16 and 17 (FIGS. 2 and 3) the desired mold closing pressure is exerted.

The operation of the apparatus will now be described in greater detail. The end of the pipe 7 to be deformed is rendered plastic by heating and then while partly projecting from the first mold part 16 is slipped on to the mandrel and clamped in the pipe clamp 6, whereupon the mold part 16, which in order to enable the pipe to be simply removed after the formation of the socket is longitudinally split along a plane containing the axis, is closed with the cylindrical portion 18c fitting around the pipe 7 and then locked.

Subsequently the mandrel is moved from its position shown in FIG. 1 to the right, i.e., towards the stationary pipe clamp 6, by means of the drive mechanism 5 until in the position shown in FIG. 2 the rod 21 strikes the mold part 16, a socket being formed on the heated pipe end during this movement over the mandrel.

In this position the mold part 16 is thrust against the rod 21 by the pipe clamp 6 via the spring 24, while the mold part 17 is thrust against the mold part 16 via the spring 25 by the thrust member 13 which follows the movement of the mounting plate 2, the edge 23 of the parting face 20 of the mould being radially aligned with the corresponding edge of the cylindrical surface 9a of greatest outer diameter of the shaping ring 9. The outer surface of the socket portion of the pipe 7, which portion owing to the radial deformation has a reduced wall thickness, lies with a certain amount of clearance in the annular molding chamber 30 between the mould parts 16 and 17 and the mandrel 1.

In the closed position of the mold parts 16 and 17 the molding chamber 30 at the end defined by the mold part 17 is closed by the thrust member 13 which engages the front face of the socket formed.

In order to increase the wall thickness of the socket by upsetting, the mandrel 1 is moved by means of the drive mechanism 5 to the right, i.e. towards the pipe clamp 6, the thrust member 13 being compelled by the still rigid cylinder-and-piston mechanism 15 to follow this movement. The mold part 16 is compelled by the rod 21, and the mould part 17 by the flange 14 of the thrust member and the spring 25, to follow the same movement against the action of the spring 24 secured to the clamp 6, so that first pipe material is supplied from the right. This movement to the right of the mandrel (FIG. 3) is limited by a rod 26 which is secured to the mounting plate 2 and on which a nut 27 is screwed which strikes a stop 28 constituted by the end of a bore provided in the frame part 3. Shortly after the beginning of the movement of the mandrel 1 the hydraulic cylinder 15 is gradually extended, enabling pipe material to be supplied from the left until the position shown in FIG. 3 is reached. The socket then has a wall thickness which is equal to the radial dimension $d$ of the molding space 30 and at least equal to the wall thickness $D$ of the original pipe 7. A line 31 in FIG. 3 shows the position of the right-hand end face of the mold part 16 during the stage of operation illustrated in FIG. 2.

The sequence of the movements has been described to facilitate an understanding of the invention. In practice this sequence will depend inter alia upon the choice of the material, the thickness of the pipe and the suitable deformation temperature. obviously this sequence may be different when the mandrel is shaped differently.

During the upsetting of the pipe material at the commencement of the movement to the right, lateral buckling of the pipe 7 at the end of the mold part 16 facing the pipe clamp 6 is avoided by guiding the pipe material surrounding the end portion 8b of the mandrel in the cylindrical portion 18c of the mold part 16.

The socket formed is then cooled and the cylinder 15 is restored to its initial position, after which the base part 8 of the mandrel is moved to its extreme left-hand position away from the clamp 6 by means of the drive mechanism 5, the thrust member 13 and the mold part 17 being compelled to follow this movement, whereas the shaping ring 9 slides along the base part 8 and remains in the socket. The ring 9 is subsequently removed from the socket by means of a tool and then slipped on the base part again. The mold part 16 is unlocked and opened, as is the pipe clamp 6, enabling the socketed pipe to be removed, after which the apparatus is ready for treating the next piping section.

I claim:

1. An apparatus for forming a socket in a pipe end, comprising:
    a mandrel adapted to be inserted in the pipe end, comprising a base part and a removable shaping ring having at least one portion having a diameter greater than the outside diameter of the pipe;
    clamping means for holding said pipe coaxially with said mandrel;
    a mold enclosing a cavity coaxial with the mandrel, comprising axially separable first and second parts having a parting face intersecting said cavity at a location of greatest diameter of said cavity, said first mold part at an end away from said parting face and adjacent said clamping means having a first interior cylindrical surface having a diameter substantially equal to the outside diameter of the pipe, said second mold part at an end away from said parting face having a second interior cylindrical surface having a diameter at least equal to said outside diameter;
    a thrust member having a tubular portion whose wall thickness is at least equal to that of the pipe, said tubular portion slidably mounted on said base part of said mandrel for relative axial motion and having an outside surface slidable within said second interior surface of the second mold part;
    means for producing relative axial displacement between said clamping member and said mandrel, mold and thrust member; and
    means for displacing said thrust member axially with respect to said mandrel and mold.

2. An apparatus as claimed in claim 1, wherein said mandrel comprises an insertion end having a conical portion whose diameter decreases from the base part toward the insertion end, and means for preventing radial distortion of the shaping ring during formation of the socket; said shaping ring is slidable on a portion of said base part, and may be slid off said base part and removed over said insertion end, said shaping ring having exterior cylindrical portions of stepwise varying diameters and adjoining conical transition portions; and said mold comprises corresponding internal cylindrical and conical surfaces, the cavity between said mandrel and said mold defining a pipe socket having a wall thickness at least as thick as approximately the wall thickness of the pipe.

3. An apparatus as claimed in claim 2 wherein said mandrel insertion end comprises a cylindrical portion extending beyond said conical portion, having an outer diameter approximately equal to the inner diameter of the pipe.

4. An apparatus as claimed in claim 1 wherein the base part of said mandrel further comprises means extending toward an insertion end for contacting a stop surface on said first mold part so as to locate said first part axially with respect to said base part when the mold is closed.

5. An apparatus as claimed in claim 4 wherein said first mold part is biased axially away from said clamping means, and said second mold part is biased axially away from said thrust member toward said clamp with a biasing force greater than that applied to said first part.

6. An apparatus as claimed in claim 4, wherein said means for displacing said thrust member is a hydraulic cylinder connected to a portion of the base part end of the mandrel.

7. An apparatus as claimed in claim 6, wherein said first mold part is longitudinally split along an axial plane.

* * * * *